A. Aldrich,
Spoke Lathe,

No 11,738.
Patented Sep. 26, 1854.

UNITED STATES PATENT OFFICE.

ARAD ALDRICK, OF PRINCETON, MASSACHUSETTS, ASSIGNOR TO JOHN L. COOPER, OF WORCESTER, MASSACHUSETTS.

MACHINE FOR CUTTING IRREGULAR FORMS.

Specification of Letters Patent No. 11,738, dated September 26, 1854.

*To all whom it may concern:*

Be it known that I, ARAD ALDRICK, of Princeton, in the county of Worcester and State of Massachusetts, have invented new and useful Improvements in Machines for Cutting Irregular Forms; and I do hereby declare that the following is a full, clear, and exact description of the same, reference being had to the drawings herewith presented, making a part of this specification, in which—

Figure 1:
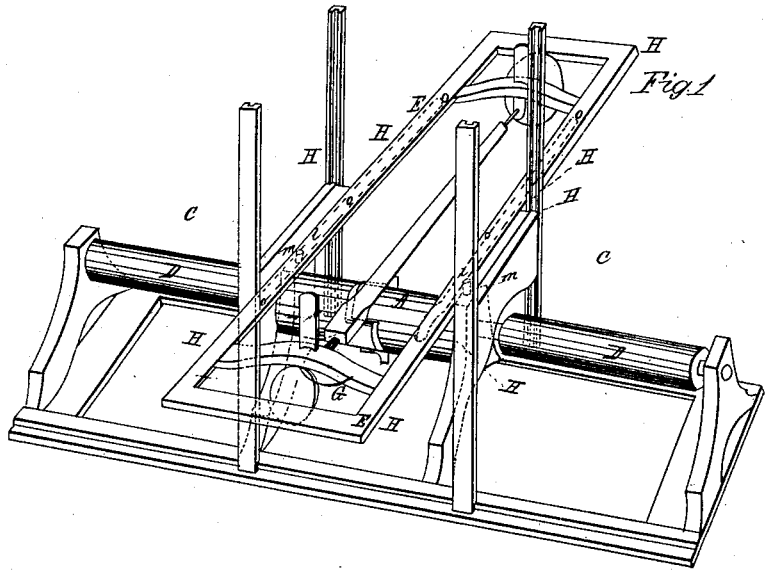
Figure 2:
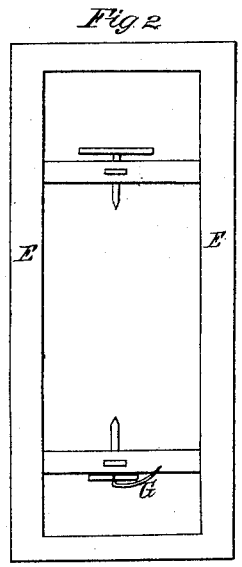
Figure 3:
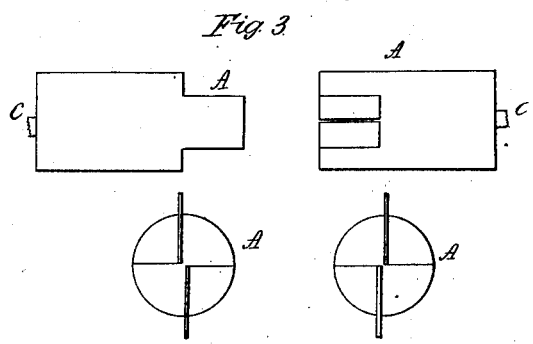
Figure 4:
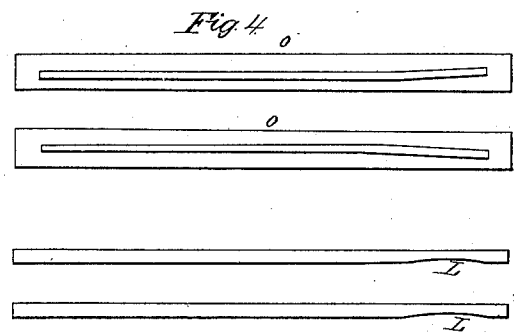

Figure 1 is a perspective view and Figs. 2 3 and 4 parts of the same, the same letters referring to the same parts in all.

The nature of my invention consists of an expansible cutter holder as shown at (A) Fig. 1 and the parts separately at (A) Fig. 3 so formed (either forked halved) that one part may slide by the other and bring the knives into the same or nearly the same plane of revolution while revolving together, the said parts being attached to spindles (C, C) running in bearings in the sliding frames or the spindles may slide in their bearings and have a collar in the spring to play in the slot of pieces (o, o,) the spindles C C being provided with pulleys (D, D) for belts to drive them (or may be driven by gear), and in connection with the cutters a frame or slide (E) fitted with adjustable cross pieces to hold the stuff to be cut having centers or holders capable of presenting the opposite sides of the same to the cutter as shown by the register and spring (G) which consists of a wheel or disk with notches in the two opposite sides for the end of spring (G) to catch into the said frame (E) being arranged with slides (H H H H) one toward and from the cutters the other by or across in the plane of its motion the under side of frame (E) having pieces (o o) Fig. 4 attached with slots in them corresponding to the variation desired to be made by the cutters in one plane and the surface of them having depressions (L) or swells corresponding to the variations desired in a plane at right angles with the former the said slots marking upon pins (i i) and thereby governing the position of the cutters in relation to each other and the surfaces resting upon guides (m) thereby when the frame moves governing the position of said frame in relation to the cutters.

To operate the machine draw the slide to that end toward which the cutters turn, put the piece to be cut between the centers or holders, give motion to the cutters and slide the frame across. It is evident that any form may be made by varying the slots and surfaces.

I do not claim the use of revolving cutters as such, but

What I do claim and desire to secure by Letters Patent is—

1. I claim the making an expansible cutter consisting of two or more parts revolving in the same plane yet capable of separation in the line of their axis in the manner and for the purpose above described.

2. I claim the combination of the cutters and governing apparatus when said governing apparatus consists or is formed by slides or surfaces corresponding to the outline of the form required taken from two or more sections at right angles with each other as described or any other substantially the same.

ARAD ALDRICK.

Witnesses:
ALONZO F. CROSMON,
JAS. G. ARNOLD.